United States Patent
Kottritsch et al.

[11] Patent Number: 6,142,673
[45] Date of Patent: Nov. 7, 2000

[54] ROLLING BEARING WITH CURRENT BRIDGE

[75] Inventors: Hubert Kottritsch, Amstetten; Ferdinand Schweitzer, St. Peter, both of Austria

[73] Assignee: SKF GmbH, Germany

[21] Appl. No.: 09/317,475

[22] Filed: May 24, 1999

[30] Foreign Application Priority Data

May 29, 1998 [DE] Germany .............. 198 24 022

[51] Int. Cl.$^7$ ................................. F16C 33/72
[52] U.S. Cl. ............... 384/476; 384/477; 277/919
[58] Field of Search ..................... 384/448, 476, 384/477, 484; 277/901, 919; 439/17

[56] References Cited

U.S. PATENT DOCUMENTS

| | | | |
|---|---|---|---|
| 3,250,580 | 5/1966 | Sikora | 384/477 |
| 3,564,477 | 2/1971 | Pompei | 439/17 |
| 4,856,916 | 8/1989 | Ito et al. | 384/477 |
| 5,139,425 | 8/1992 | Daviet et al. | 384/477 X |
| 5,863,135 | 1/1999 | Bildtsen et al. | 384/477 |

FOREIGN PATENT DOCUMENTS

| | | |
|---|---|---|
| 0 787 915 A1 | 2/1997 | European Pat. Off. . |
| 5-126158 | 10/1991 | Japan . |
| 2159892 | 6/1985 | United Kingdom . |

*Primary Examiner*—Thomas R. Hannon
*Attorney, Agent, or Firm*—Eugene E. Renz, Jr., P.C.

[57] ABSTRACT

A rolling bearing having an inner ring, an outer ring, and a plurality of rolling elements between the rings. A seal is mounted in the annular space between the rings comprising a flat disk (6), mounted to one of the bearing rings made of a material with good electrical conductivity. An annular member (9), attached to the other bearing ring whereby the seal functions as a current bridge to carry away electrical current according between the two bearing rings.

7 Claims, 2 Drawing Sheets

ROLLING BEARING WITH CURRENT BRIDGE

FIELD OF THE INVENTION

The present invention relates to a roller bearing have an inner ring, an outer ring, a plurality of rolling elements and a seal in the annular space between the inner and outer bearing rings serving as a current bridge to carry away electrical current which occurs between the bearing rings in some applications.

BACKGROUND OF THE INVENTION

In electrical machines such as traction motors in electrically powered vehicles, the roller bearings are exposed to the passage of current. When the amount of current passing through a roller bearing exceeds a certain density at the contact points between the rolling elements and the raceways, the surfaces of the raceways and thus the bearing itself are destroyed. Roller bearings which are exposed to the passage of current must therefore be protected from such current at least to the extent that the current density does not reach or exceed the danger limit in the roller bearing. It is known that current bridges can be provided outside the roller bearing for this purpose. In these applications, the contact resistance must be calculated so that the roller bearing is protected from the current.

It is also known that the cage or the seal of the roller bearing can be provided as a current bridge. EP 787,915 A1 describes a roller bearing with rolling elements which consist of electrically non-conductive material. One of the bearing rings has a seal or the like attached to it. This seal touches both bearing rings and is designed to be electrically conductive, so that the electrical current is carried away from the roller bearing or so that electrical signals can be conducted through the roller bearing.

The rolling elements in this known solution are either made completely of non-conductive ceramic material or are covered with a coating of this material. The seal consists of a suitable plastic. This arrangement has certain disadvantages and drawbacks. For example, the problem in the prior art with the arrangement shown in Patent EP 787 915A1 is that the seal is a sliding seal which tends to wear at its lip portion. The erosion of the sliding element necessitates replacement from time to time. Furthermore, it has been observed that there is a build up at the seal lip which effects the current carrying capacity.

SUMMARY OF THE INVENTION

The task of the present invention is to create a rolling bearing of the type indicated above in which the roller bearing parts themselves do not have to be made out of or coated with a special material and in which the amount of current which can be transferred can be adapted easily to the specific application in question. Accordingly, it is an objective of the present invention, therefore, to provide a rolling bearing made of conventional materials with a seal that serves that dual function of directing the electrical currents along a predetermined path remote from the contact zone of the rolling elements and raceways and also provide a reserve for bearing lubricant.

In accordance with the present invention, the seal consists of an essentially flat disk, attached to one of the bearing rings, and a ring member attached to the other bearing ring, these two parts being in electrical contact with each other. As a result of the two-part design, it is possible to design the annular conductor member which accepts the electrical current in such a way that it can carry the current directly away, so that it no longer needs to flow through the second bearing ring. In accordance with another feature of the invention, the annular conductor member can, for this purpose, be provided with appropriate conductors such as soldered-on grounding cables or the like, which are connected to a ground connection point.

In accordance with another feature of the invention, the flow of current can be improved by providing the periphery of the free edge of the disk with brushes or the like, made of material with good electrical conductivity, these brushes being designed to rest against the annular conductor member.

To protect the contact points between the disk and the annular conductor member from external influences more effectively, a "U"-shaped space bounded on both sides is provided in accordance with another feature of the invention, into which space the free edge of the disk fits.

In a preferred embodiment of the invention, the annular conductor member is "L"-shaped; that is, it is an angle annular conductor member, the radial sidepiece of which cooperates with a shoulder on the bearing ring to form the space bounded on both sides, into which the free edge of the disk fits.

In another preferred embodiment of the invention, the annular conductor member itself is designed with a U-shape, and the free edge of the disk fits into the space between the radial sidepieces of this U-shaped annular conductor member.

As a result of these embodiments, the sealing effect is improved, and at the same time the free edge of the disk itself is more effectively protected from external influences. If the edge of the disk is provided with brushes, the brushes are more effectively protected.

These designs also offer the additional advantage that the space bounded on two sides, into which the free edge of the disk fits, can, in accordance with another feature of the invention, be filled with a lubricating grease with good electrical conductivity, which improves the flow of the current. This grease can also contain conductive additives such as graphite, iron powder, etc., which lead to a further improvement in electrical conductivity. The lubricating grease also serves to seal the bearing.

When lubricating grease is used in the ring-shaped space, it is advantageous in accordance with another feature of the invention to connect the disk to the rotating ring and to connect the ring to the stationary bearing ring. As a result of these measures, the lubricating grease, which can escape from the space bounded on two sides as a result of vibrations during operation, is thrown back into the ring-shaped space by the centrifugal force generated by the rotation of the disks, which ensures the continuous electrical conductivity of the system. Of course, it is also possible to use the roller bearing according to the invention to carry electrical signals between a rotating and a stationary machine component.

BRIEF DESCRIPTION OF THE DRAWINGS

These and other objects of the present invention and various features and details of the operation and construction thereof are hereinafter more fully set forth with reference to the accompanying drawings, wherein.

DESCRIPTION OF THE METHOD AND SYSTEM

Figure 1:
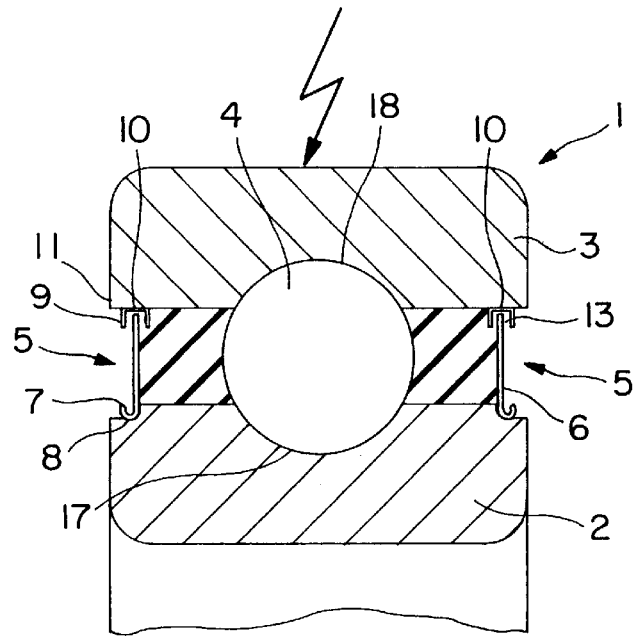
FIG. 1 shows a cross section of the roller bearing according to the invention with a seal.

Referring now to the drawings and particularly to FIG. 1, roller bearing 1 according to FIG. 1 consists of an inner ring 2, an outer ring 3, and several rolling bodies 4, in this case balls, which are distributed around the circumference and guided in a cage (not shown). This roller bearing 1 is used in, for example, a traction motor for rail vehicles and is exposed to the flow of electric current, indicated by the lightning bolt.

To conduct the electrical current, roller bearing 1 is provided with a seal 5. In the present example, there is a seal on both sides. This seal comprises a disk 6, which is attached by a folded-over inner section 7 to an annular ring-shaped slot 8 in inner ring 2, and a U-shaped annular conductor member 9, which is attached by its bushing-like base 10 to shoulder surface 11 of outer ring 3. Free edge 12 of disk 6 fits into space 13 between the radially oriented side pieces 14, 15 of annular conductor member 9.

Figure 2:
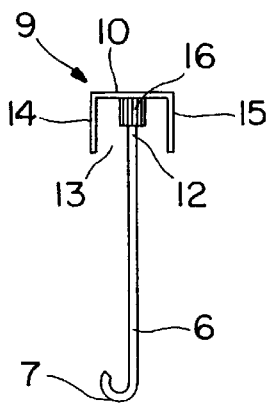
FIGS. 2–5 show several exemplary embodiments of the seal in cross section.

According to the exemplary embodiment of FIG. 2, free edge 12 of disk 6 is provided with brushes 16 around the circumference, which are in contact with annular conductor member 9 and thus make it possible for the current to flow across. The current therefore does not need to flow across the contact points between rolling elements 4 and raceways 17, 18 of inner ring 2 and outer ring 3.

Figure 3:
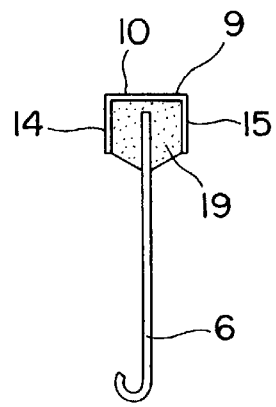

In the exemplary embodiment according to FIG. 3, space 13 between radially oriented sidepieces 14, 15 is filled with a lubricating grease 19 with good electrical conductivity. This lubricating grease 19 represents the conductive connection between disk 6 and annular conductor member 9.

Figure 4:
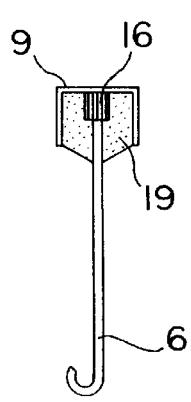

In the exemplary embodiment according to FIG. 4, which shows a combination of FIG. 2 and FIG. 3, disk 6 is provided with brushes 16 and space 13 is filled with lubricating grease 19. Thus the current is transferred both by the brushes and by the lubricating grease.

Figure 5:
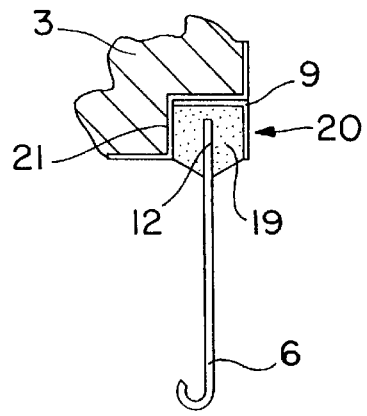

In the exemplary embodiment according to FIG. 5, finally, annular conductor member 9 is L-shaped; that is, it is an angle ring with a radially oriented sidepiece 20, which can thus be pushed against shoulder 21 formed in bearing ring 3 by an undercut, etc., so that space 13, into which free edge 12 of disk 6 fits, is formed between shoulder 21 and radial sidepiece 20. This space 13 is again filled with a lubricating grease with good electrical conductivity.

Disk 6 or annular conductor member 9 can be provided with, or suitably connected to, devices (not shown) for carrying away the electrical current.

Figure 6:
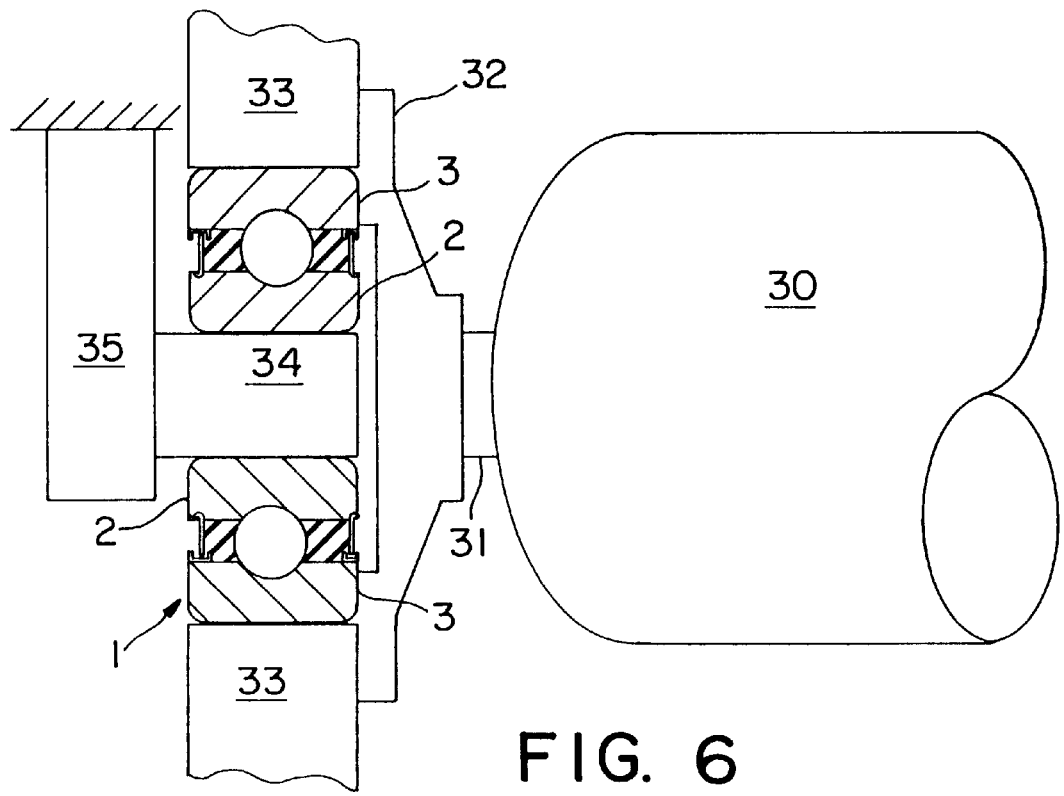
FIG. 6 is a side elevational view showing the bearing partly in section of a typical motor assembly incorporating a bearing in accordance with the present invention.

A typical rolling bearing installation is shown in FIG. 6, wherein wheel 33 is driven by electrical motor 30 through shaft 31 and hub 32. Outer ring 3 of bearing 1 is attached to and rotates with wheel 33. Inner ring 2 of bearing 1 is stationary and attached to chassis 35 through shaft 34. Without a current bridge, currents that may be present in bearing 1, will tend to flow through the rolling elements in this case ball causing deterioration of the balls and eventual failure. With a current bridge, currents that may be present in bearing 1, will flow through the path of least resistance from outer ring 3 through seal 5, which acts as a current bridge.

Figure 7A:
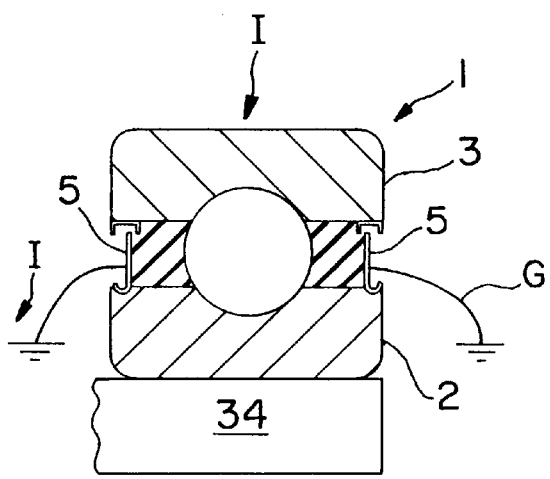
FIG. 7A is a sectional view showing another feature of the present invention.
Figure 7B:
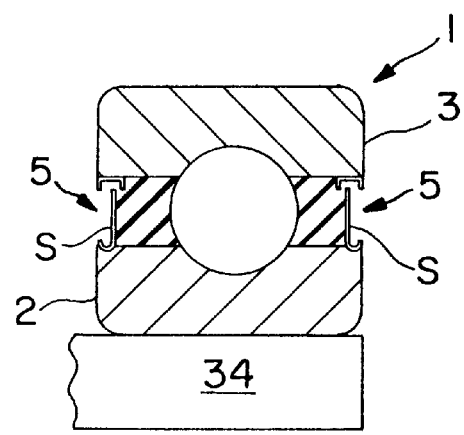
FIG. 7B is a view similar to FIG. 7A, showing still another feature of the present invention.

In accordance with another feature of the present invention, illustrated in FIG. 7A, current I flows through outer ring 3 to seal 5 and then to ground through conductor G. To monitor critical bearing parameters, a signal conductor S may be attached to seal 5 as shown in FIG. 7B to transmit data for evaluation.

Even though particular embodiments of the present invention have been illustrated and described herein, it is not intended to limit the invention and changes and modifications may be made therein within the scope of the following claims for example.

What is claimed is:

1. In a rolling bearing having an inner ring, an outer ring, and a plurality of rolling elements between the rings, a seal in the annular space between the rings comprising a flat disk (6) mounted to one of the bearing rings made of a material with good electrical conductivity, an annular member (9) attached to the other bearing ring and an element made of an electrically conductive material connecting said disk (6) and annular member (9) whereby the seal functions as a current bridge to carry away electrical current flowing between the inner and outer bearing rings and means defining a ring-shaped space (13), bounded on both sides into which the free edge (12) of the disk (6) fits.

2. Rolling bearing according to claim 1, characterized in that the ring (9) is L-shaped, and wherein a radial sidepiece (20) thereof cooperates with a shoulder (21) of the bearing ring (3) to form space (13) bounded on both sides, into which the free edge (12) of the disk (6) fits.

3. Rolling bearing according to claim 1, characterized in that the ring (9) is U-shaped and forms the space (13) bounded on both sides, wherein the free edge (12) of the disk (6) fits into the space (13) between the radial sidepieces (14, 15) of the U-shaped ring (9).

4. Rolling bearing according to claim 1, wherein the space (13) is filled with a lubricating grease (19) with good electrical conductivity.

5. Rolling bearing according to claim 4, wherein the lubricating grease (19) contains additives with good electrical conductivity.

6. Rolling bearing according to claim 5, wherein the additive is graphite.

7. Rolling bearing according to claim 5, wherein the additive is iron powder.

* * * * *